(12) United States Patent
Char et al.

(10) Patent No.: US 12,235,936 B2
(45) Date of Patent: *Feb. 25, 2025

(54) SYSTEM AND METHOD FOR AUTOMATIC DIGITAL COPY FOR PHYSICAL MEDIA PURCHASE

(71) Applicant: NBCUniversal Media, LLC, New York, NY (US)

(72) Inventors: Alan Char, Sunnyvale, CA (US); Nick Brailas, San Jose, CA (US); Anthony Marcar, San Francisco, CA (US); Michael Ye, Palo Alto, CA (US); Oleksiy Kokhanyy, Mountain View, CA (US); Hua Li, Fremont, CA (US)

(73) Assignee: NBCUniversal Media, LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/544,694

(22) Filed: Aug. 19, 2019

(65) Prior Publication Data

US 2019/0370438 A1    Dec. 5, 2019

Related U.S. Application Data

(63) Continuation of application No. 14/575,656, filed on Dec. 18, 2014, now Pat. No. 10,387,630.
(Continued)

(51) Int. Cl.
*G06F 21/10* (2013.01)
*G06Q 20/12* (2012.01)
*G06Q 30/0601* (2023.01)

(52) U.S. Cl.
CPC ......... *G06F 21/105* (2013.01); *G06Q 20/123* (2013.01); *G06Q 30/0601* (2013.01); *G06F 21/1014* (2023.08)

(58) Field of Classification Search
CPC .......... G06F 21/105; G06F 2221/0711; G06Q 30/0601; G06Q 20/123
See application file for complete search history.

(56) References Cited

U.S. PATENT DOCUMENTS 8,612,298 B1 * 12/2013 Talreja ................ H04L 63/0428
                                                    705/26.1
8,666,824 B2   3/2014 Holmes
(Continued)

OTHER PUBLICATIONS

Peckham, Matt, "Wal-Mart launches Vudu Disc-to-Digital Store Program: Here's How It Works", pp. 1-3, obtained from https://www.techhive.com/article/253873/wal_mart_launches_vudu_disc_to_digital_store_program_heres_how_it_works.html Mar. 9, 2018.

*Primary Examiner* — Jeffrey D. Popham
(74) *Attorney, Agent, or Firm* — Fletcher Yoder, P.C.

(57) ABSTRACT

Systems and methods including one or more processors and one or more non-transitory storage devices storing computing instructions configured to run on the one or more processors and perform acts of receiving a unique identifier from a user, wherein the unique identifier is associated with a purchase of a physical media item; determining when the unique identifier is associated with an electronic media account; when the unique identifier is associated with the electronic media account: sending a verification message to an electronic communication address associated with the unique identifier to (a) inform the user of an availability of electronic media associated with the physical media item and (b) provide a verification token that, when transmitted to an electronic media provider, facilitates a modification of the electronic media account to grant access to the electronic media associated with the physical media item; and when the unique identifier is not associated with the electronic media account: storing a cookie on an electronic device of the user, the cookie comprising data verifying the purchase
(Continued)

of the physical media; receiving a signal indicating that the user has associated the unique identifier with the electronic media account; and facilitating a detection of a presence of the cookie on the electronic device of the user to facilitate the modification of the electronic media account to grant access to the electronic media associated with the physical media item. Other embodiments are disclosed herein.

20 Claims, 6 Drawing Sheets

Related U.S. Application Data

(60) Provisional application No. 62/059,999, filed on Oct. 5, 2014.

(56) References Cited

U.S. PATENT DOCUMENTS

| | | |
|---|---|---|
| 2010/0131342 A1 | 5/2010 | Thibedeau et al. |
| 2012/0311723 A1* | 12/2012 | Britt, Jr. .............. G06F 21/6218 726/28 |
| 2013/0016955 A1* | 1/2013 | Pejaver .............. H04N 21/2747 386/248 |
| 2013/0247120 A1* | 9/2013 | Milgramm ......... H04N 21/4826 725/110 |
| 2014/0026048 A1* | 1/2014 | Spirer ................... G06F 3/0484 715/716 |
| 2015/0058162 A1* | 2/2015 | Purves ................. G06Q 20/363 705/26.8 |

* cited by examiner

SYSTEM AND METHOD FOR AUTOMATIC DIGITAL COPY FOR PHYSICAL MEDIA PURCHASE

CROSS-REFERENCE TO RELATED APPLICATIONS

This application claims priority to Non-Provisional application Ser. No. 14/575,656, filed Dec. 18, 2014, which claims the benefit of Provisional Patent Application Ser. No. 62/059,999, filed Oct. 5, 2014. Non-Provisional application Ser. No. 14/575,656 and Provisional Patent Application Ser. No. 62/059,999 are incorporated by this reference in their entirety.

TECHNICAL FIELD

This disclosure relates generally to a media files, and relates more particularly to physical media files and related streaming media files.

BACKGROUND

People often desire to view or listen to media content at their home or place of business. Media content may include movies, television shows, music, audio books, and the like. Music is often purchased in the form of physical media such as CDs as well as via downloadable digital media, such as MP3s. Music may also be streamed (such that the media file does not need to be fully transmitted before playback begins). Movies and television shows may be purchased in a physical format such as DVDs and Blu-rays. Movies also can be streamed or downloaded using a variety of file formats and streaming services. It can be desirable for a user who purchases media in a physical format to also have access to the media in a digital format and/or via streaming.

BRIEF DESCRIPTION OF THE DRAWINGS

To facilitate further description of the embodiments, the following drawings are provided in which.

Figure 1:
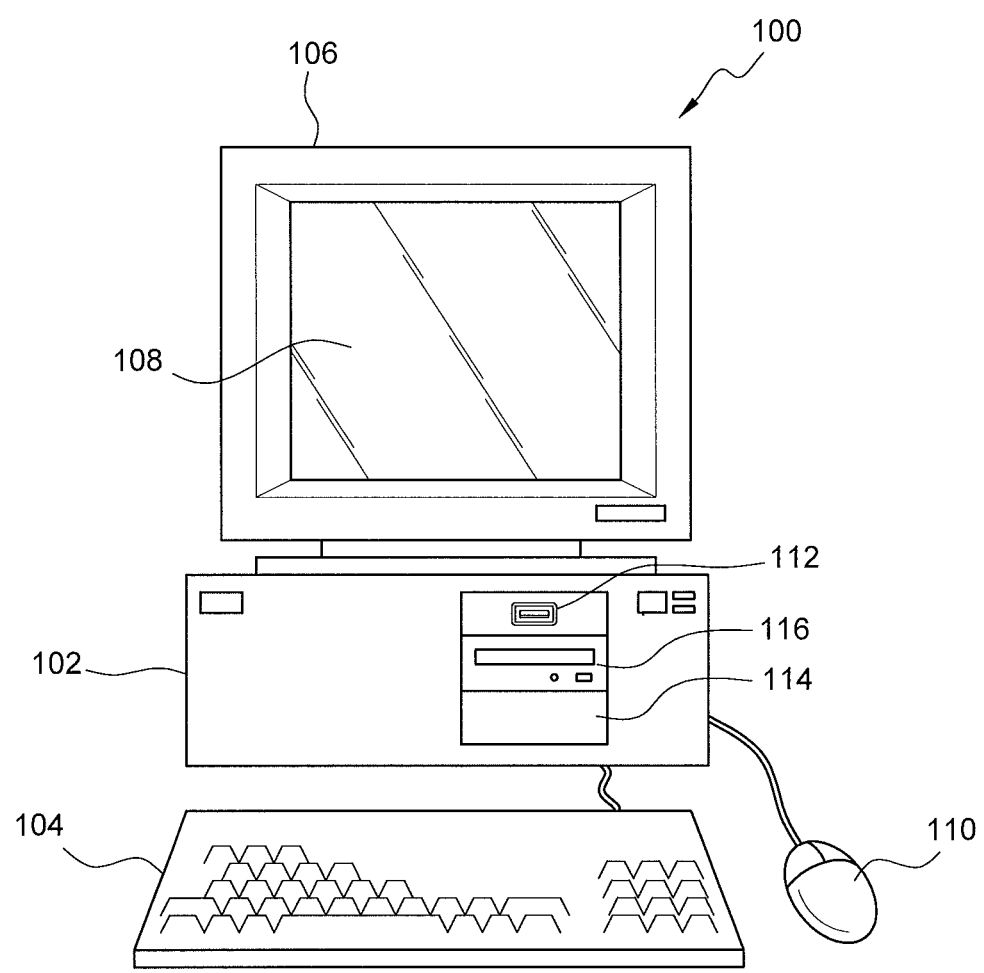
FIG. 1 illustrates a front elevation view of a computer system that is suitable for implementing an embodiment of the system.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

A number of embodiments can include a system. The system can include one or more processors and one or more non-transitory computer-readable storage devices storing computing instructions. The computing instructions can be configured to run on the one or more processors and perform acts of receiving a unique identifier from a user, wherein the unique identifier is associated with a purchase of a physical media item; determining when the unique identifier is associated with an electronic media account; when the unique identifier is associated with the electronic media account: sending a verification message to an electronic communication address associated with the unique identifier to (a) inform the user of an availability of electronic media associated with the physical media item and (b) provide a verification token that, when transmitted to an electronic media provider, facilitates a modification of the electronic media account to grant access to the electronic media associated with the physical media item; and when the unique identifier is not associated with the electronic media account: storing a cookie on an electronic device of the user, the cookie comprising data verifying the purchase of the physical media; receiving a signal indicating that the user has associated the unique identifier with the electronic media account; and facilitating a detection of a presence of the cookie on the electronic device of the user to facilitate the modification of the electronic media account to grant access to the electronic media associated with the physical media item.

Various embodiments include a method. The method can be implemented via execution of computing instructions configured to run at one or more processors and configured to be stored at non-transitory computer-readable media. The method can comprise receiving a unique identifier from a user, wherein the unique identifier is associated with a purchase of a physical media item; determining when the unique identifier is associated with an electronic media account; when the unique identifier is associated with the electronic media account: sending a verification message to an electronic communication address associated with the unique identifier to (a) inform the user of an availability of electronic media associated with the physical media item and (b) provide a verification token that, when transmitted to an electronic media provider, facilitates a modification of the electronic media account to grant access to the electronic media associated with the physical media item; and when the unique identifier is not associated with the electronic media account: storing a cookie on an electronic device of the user, the cookie comprising data verifying the purchase of the physical media; receiving a signal indicating that the user has associated the unique identifier with the electronic media account; and facilitating a detection of a presence of the cookie on the electronic device of the user to facilitate the modification of the electronic media account to grant access to the electronic media associated with the physical media item.

In some embodiments, a method can comprise: receiving a unique identifier upon a purchase of a physical media item; determining if the unique identifier is associated with a streaming service account; if the unique identifier is associated with the streaming service account, modifying the streaming service account to grant access to streaming media associated with the physical media item; notifying a user of the availability of streaming media associated with the physical media item; receiving a request to initiate playback of the streaming media associated with the physical media item; and transmitting the streaming media associated with the physical media item to the user for playback.

In some embodiments, a system can comprise one or more processing modules; and one or more non-transitory storage modules storing computing instructions configured to run on the one or more processing modules and perform the acts of: receiving a unique identifier upon a purchase of a physical media item; determining if the unique identifier is associated with a streaming service account; if the unique identifier is associated with the streaming service account, modifying the streaming service account to grant access to streaming media associated with the physical media item; notifying a user of the availability of streaming media associated with the physical media item; receiving a request to initiate playback of the streaming media associated with the physi-cal media item; and transmitting the streaming media associated with the physical media item to the user for playback.

Figure 2:
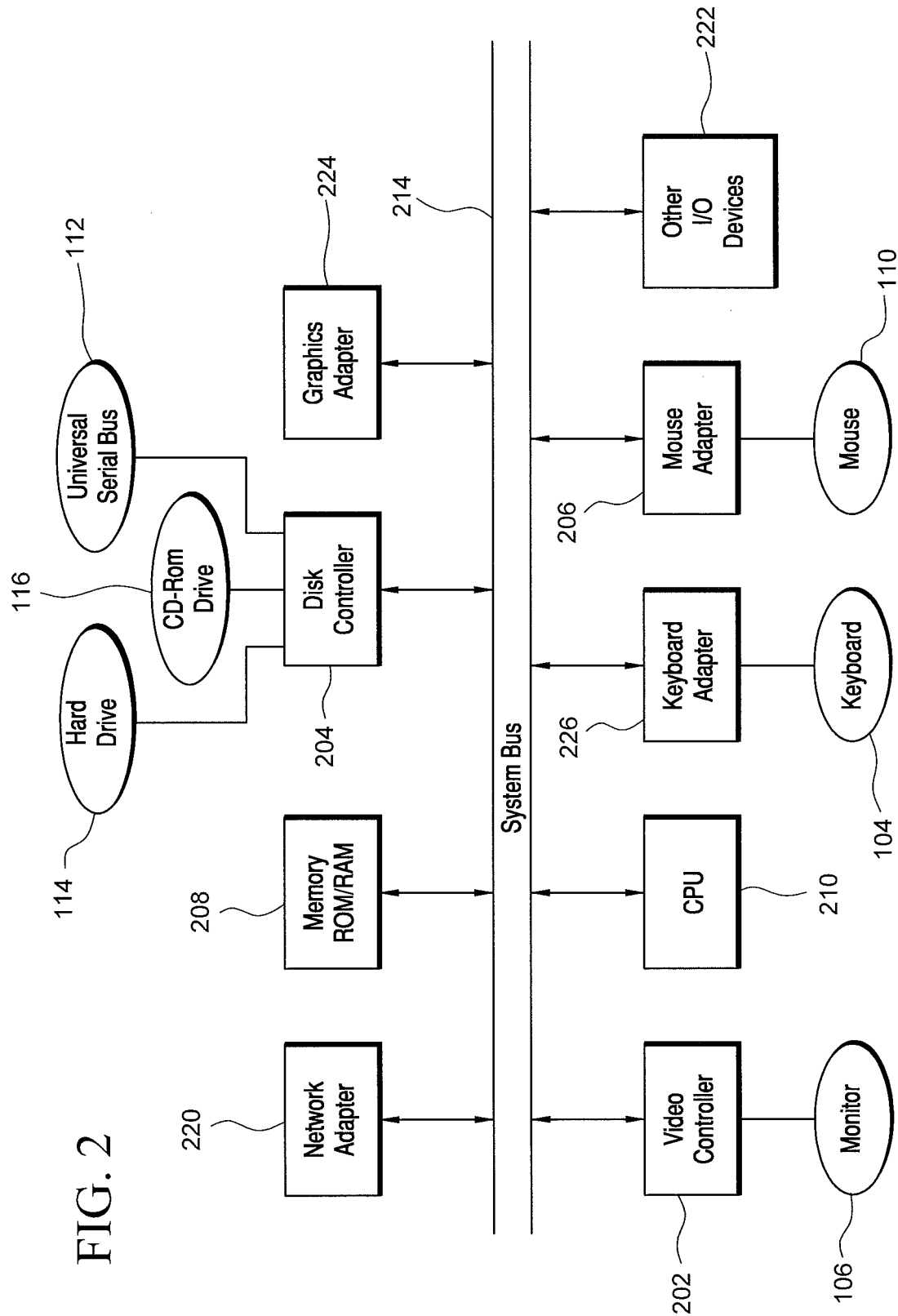
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for implementing the techniques described herein. As an example, a different or separate one of a chassis 102 (and its internal components) can be suitable for implementing the techniques described herein. Furthermore, one or more elements of computer system 100 (e.g., a refreshing monitor 106, a keyboard 104, and/or a mouse 110, etc.) also can be appropriate for implementing the techniques described herein. Computer system 100 comprises chassis 102 containing one or more circuit boards (not shown), a Universal Serial Bus (USB) port 112, a Compact Disc Read-Only Memory (CD-ROM), Digital Video Disc (DVD) drive, or Blu-ray drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 comprises both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can comprise microcode such as a Basic Input-Output System (BIOS) or Unified Extensible Firmware Interface (UEFI). In some examples, the one or more memory storage units of the various embodiments disclosed herein can comprise memory storage unit 208, a USB-equipped electronic device, such as, an external memory storage unit (not shown) coupled to universal serial bus (USB) port 112 (FIGS. 1-2), hard drive 114 (FIGS. 1-2), and/or CD-ROM, DVD drive, or Blu-ray drive 116 (FIGS. 1-2). In the same or different examples, the one or more memory storage units of the various embodiments disclosed herein can comprise an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Some examples of common operating systems can comprise various versions/distributions of Microsoft® Windows® operating system (OS), Apple® OS X, UNIX® OS, and Linux® OS.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

In some embodiments, network adapter 220 can comprise and/or be implemented as a WNIC (wireless network interface controller) card (not shown) coupled to an expansion port (not shown) in computer system 100 (FIG. 1). In other embodiments, the WNIC card can be a wireless network card built into computer system 100 (FIG. 1). A wireless network adapter can be built into computer system 100 by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 and the circuit boards inside chassis 102 (FIG. 1) are not discussed herein.

When computer system 100 in FIG. 1 is running, program instructions stored on a USB-equipped electronic device connected to USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out at least part of the techniques described herein.

Although computer system 100 is illustrated as a desktop computer in FIG. 1, there can be examples where computer system 100 can take a different form factor while still having functional elements similar to those described for computer system 100. In some embodiments, computer system 100 can comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 can comprise a portable computer, such as a laptop computer. In certain other embodiments, computer system 100 can comprise a mobile device, such as a smart phone or a tablet. In certain additional embodiments, computer system 100 can comprise an embedded system. It should also be understood that a particular configuration of computer system 100 may or may not contain each of the items shown in FIG. 1 or 2 or may in fact contain multiple of each of the items shown in FIG. 1 or 2. For example, certain implementations of computer system 100 may not contain a CD-ROM, DVD, or Blu-ray drive 116. Other implementations of computer system 100 may contain two CD-ROM, DVD, or Blu-ray drives 116. Other implementations of computer system 100 can contain 2 or more monitors 106. Other implementations of computer system 100 could contain no monitors. Other implementations of computer system 100 can contain equivalents to certain items. For example, hard drive 114 can be replaced or augmented by a solid-state drive (SSD). Computer system 100 could be a special-purpose machine, such as a set-top box or video game console. In other embodiments, computer system 100 can be a general-purpose computer.

Today's technology provides many different ways for users to access media content. Optical discs such as compact discs (CDs), DVDs, and Blu-ray discs provide music, movie, and television ("TV") show content to users in a high-quality, yet compact medium. Other physical formats are also possible for such media content, such as memory cards or other physical formats that might be developed in the future. High-speed Internet connectivity allows users to "stream" or otherwise download content over the Internet to their Internet-capable devices, without the need to use physical media. The term streaming might refer to a situation where a media file is temporarily downloaded by a user and capable of being viewed while being transferred to the user. In some implementations of streaming, a user no longer has access to the streamed file after being viewed or listened to. In some implementations, the user can have access to the streamed file after an initial viewing or being listened to. Downloading might refer to a mechanism whereby an entire media file is transferred to the user and remains available to a user after viewing. In some embodiments, there might be a distinction between "streaming" and "downloading," such as a cost difference where streaming is less expensive to the user than downloading. In other embodiments, streaming and downloading might be treated in a similar manner. In some embodiments, reference will be made to a "streaming service," which can apply to a provider of media content through the Internet. The term "streaming service" also can apply to services where users can "download" media content in the manner described above.

Exemplary media content can include, but is not limited to, movies, music, TV shows, books, audio books, magazines, podcasts, radio shows, and the like. Internet-capable devices can include, but are not limited to, set-top boxes, gaming consoles, personal computers, tablets, smartphones, and the like. Some Internet-capable devices also provide the capability to read optical media, such as compact discs (CDs), Digital Versatile Discs (DVDs), and Blu-ray discs through the use of an attached or built-in optical reader and/or writer. As of 2014, exemplary Internet-capable devices can include tablets such as the Apple® iPad®, Microsoft® Surface®, Samsung® Galaxy Tab, and Amazon® Kindle Fire, set top boxes or plug-in devices such as Roku®, Google® Chromecast®, and Apple® TV, video game devices such as the Sony® Playstation® 3 and Playstation® 4, Nintendo® Wii and Wii U, and Microsoft® Xbox 360 and Xbox One, personal computers (including both desktop and laptop devices), Blu-ray drives, DVD drives, and smart TVs.

With such an Internet-capable device, a user can select media content that he wishes to read, view, and/or hear. The user can read, view, and/or hear the media content on or from a built-in display, or via a TV, monitor, and/or speaker that is coupled to the Internet-capable device.

However, consumers still wish to purchase physical media, such as optical discs. There can be several reasons for the desire for physical media. For example, media can be of higher quality when in physical form than in streaming form. For example, if an Internet connection becomes bandwidth limited, the quality of the media stream can go from High Definition (HD) quality (1920×1080 pixels or 1280×720 pixels) to much lower (such as 720×480 pixels or even lower). If the bandwidth becomes very limited, the results also can include buffering or stuttering, resulting in a sub-optimal user experience. Such issues do not exist, however, with Blu-ray discs or DVDs, which maintain the same viewing quality all the time. In addition, physical media is portable in the sense that physical media can be viewed on any media player without the need to sign in to an account or even be connected to the Internet. In addition, physical media cannot be taken away from the owner, while a user can cease to be able to use streaming media if the user cancels an account with a streaming service or in certain other circumstances. Also, in some embodiments, a user might be limited to a single viewing of streaming content. In contrast, a user can watch media files on physical media an unlimited amount of time.

On the other hand, there are advantages that streaming/downloadable media have over physical media. For example, streaming media is portable as long as the user is signed into their account. Downloadable media can be portable even without an Internet connection. Streaming media can be viewed on devices that do not have optical media players, such as smartphones and tablets. Streaming media cannot be scratched and rendered unusable.

In many cases, consumers want to have media content in a physical format and access to a streaming or downloadable copy of the same media content. Existing methods and systems might rely on a user entering in a code in the packaging of the physical media or inserting the physical media into an optical drive to prove ownership. But there are negatives to those methods and systems. For example, both methods require a user to perform an additional verification step in order to have access to the streaming content. For example, there might be a requirement to insert physical media into a drive to prove ownership of the physical media. The requirement to insert the physical media into a drive also runs into problems from the point of view of the content producer. For example, inserting the physical media proves only possession, not ownership—a user could rent a DVD or Blu-ray from the library or rental retailer, or borrow the same from a friend in order to gain access to streaming media.

Embodiments provide a service that automatically gives certain customers access to digital copies (for streaming or for download) of media files purchased on physical media such as CD, DVD, or Blu-ray. The purchases can be made at either a physical brick and mortar store or at a store's web site. When a customer buys physical media, an embodiment can use a unique identifier to identify the customer's streaming account. In other embodiments, the customer's unique identifier can be used to establish an account in cases where the customer does not already have a streaming account. Thereafter, a customer can be granted access to a digital version of the purchased title on a streaming service. Embodiments also can allow a customer to register DVD and Blu-ray purchases without entering the unique identifier, either by entering a numeric or alphanumeric code on the receipt or by scanning a bar code or a QR code that is printed on the receipt.

Figure 3:
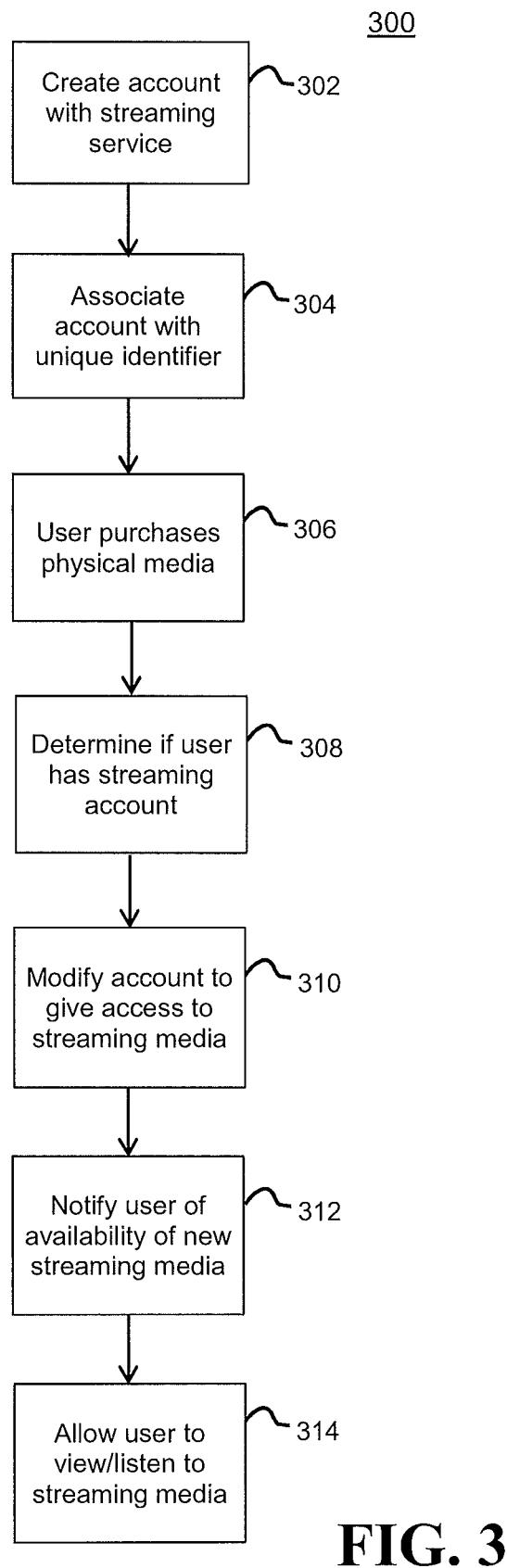
FIG. 3 is a flowchart illustrating the operation of an embodiment.

With reference to FIG. 3, a flowchart is provided illustrating a method 300 for providing user access to a digital copy after purchasing physical media. Various aspects of method 300 can be performed on a computer system 100 (FIG. 1). Method 300 is merely exemplary and is not limited to the embodiments presented herein. Method 300 can be employed in many different embodiments or examples not specifically depicted or described herein. In some embodiments, the procedures, the processes and/or the activities of method 300 can be performed in the order presented. In other embodiments, the procedures, the processes, and/or the activities of method 300 can be performed in any other suitable order. In still other embodiments, one or more of the procedures, the processes, and/or the activities of method 300 can be combined or skipped.

To use an embodiment, a user can sign up for a streaming service or is already a member using that streaming service (block 302). As is known in the art, there are a variety of different streaming services available today, and there will likely be new streaming services made in the future. Exemplary streaming services for video include Vudu, Netflix, Amazon Prime, Hulu, and the like. Exemplary streaming services for audio include Spotify, iTunes Radio, Pandora, iHeartRadio, and the like. What many streaming services have in common is that they can request that the user create an account with the streaming service, such that the service can keep track of user's likes, payments, and level of service. At block 302, a user can either create an account for the streaming service. A streaming service provider can provide various means to allow a user to create an account, such as via a web-page, or via an app on a smartphone or tablet.

At a user's streaming service account page, a user can associate the account that was created in block 302 with a unique identifier (block 304). This association can be done during the creation of an account with the streaming service. In addition, a user can add the unique identifier to an already existing streaming service account. In some embodiments, the unique identifier can be a cellular telephone number, but other unique identifiers can be used.

A cellular telephone number has a number of features that can be desirable for use as a unique identifier. For example, the number is relatively unique—although telephone numbers can change occasionally, typically, each telephone number is only associated with one entity at a time. In addition, the fact that the unique identifier is a telephone number allows the streaming service to send and receive short message system (SMS) messages to a user about the user's streaming service account. Moreover, a user is very likely to remember his/her own telephone number, so the user will be able to provide the unique identifier when asked. In addition, it can be common for a retailer to request a telephone number of a user at both brick and mortar or on-line retailers.

Thereafter, a user can purchase physical media (block 306). The purchase can be performed in a variety of different manners. In some embodiments, the user can purchase the physical media in person, at a brick and mortar store. In some embodiments, the user can purchase the physical media remotely, such as via the Internet, including using a web interface or using a mobile "app." Other embodiments can also be possible.

Upon making the purchase, an embodiment can determine that the purchaser has an account at a streaming service (block 308). Such a task can be performed in a variety of different manners. In some embodiments, the user provides his unique identifier upon purchasing physical digital media content. In embodiments where the unique identifier is a user's cell phone number, the user can provide a cell phone number when performing a "check-out" at either a brick and mortar store or via an Internet storefront. At a brick and mortar store, there is commonly a point-of-sale (POS) terminal at a checkout stand. When purchasing the physical media content, the user can be prompted to enter his/her unique identifier into the POS terminal. In some embodiments, a person working at the brick and mortar store can enter the unique identifier after asking the user for his/her unique identifier. In some embodiments, a user can have a bar code scanned when he/she makes the purchase. For example, some retailers provide "rewards" to users for frequent purchasing. As part of the reward program, the retailer can issue a card with a scannable bar code associated with the user. That bar code can be associated with the unique identifier and/or the user's account with a streaming service.

At an electronic commerce (eCommerce) retailer, a user is typically required to enter contact information as part of the check-out process. The contact information typically includes a name and address (both of which might be used for delivery purposes), and payment information to complete the purchase. In some embodiments, the user can also be requested to enter his unique identifier. In embodiments where the unique identifier is the user's telephone number or cellular telephone number, such information is already commonly gathered as part of a check-out process. In some embodiments, the unique identifier is not the user's account number or other log-in information.

The unique identifier is then sent to the streaming service provider. The streaming service provider can access a database to determine if the unique identifier belongs to an account. Once the account at the streaming service has been linked to the unique identifier, the purchaser is given the ability to access to the newly purchased media on the user's streaming service account (block 310). Thus, the user is able to stream and/or download a version of the media content in addition to being able to view and/or listen to the physical media. This can be accomplished in a variety of different manners. For example, an entry can be made in a database associating the digital media that he just purchased with the user's streaming service account. Thereafter, the next time the user accesses his/her streaming service account, there will be an indication that the particular media file that he purchased in a physical format is now available on his/her streaming service account.

A user can then be notified that his/her streaming service now has access to the media file that he/she just purchased in a physical format (block 312). This notification can occur in a variety of different manners. In some embodiments, the next time the user logs into his/her streaming service account, there can be a notification that new media is associated with his/her account. In some embodiments, an email can be sent to the user indicating the presence of new media associated with his/her account. There can be a URL in the email that directs the user to access his/her streaming service account directly. In some embodiments, the URL can take the user directly to the newly available media content.

In some embodiments, a text message or SMS message can be sent to the user informing the user of the availability of the newly purchased media in a streaming format to go along with their physical copy. In some embodiments, a smartphone/tablet app can direct a notification to the user. Such a notification can be made in a variety of ways. For example, both Android and iOS have a notification panel that is available to users notifying the user of certain events. An embodiment can use the notification panel to notify the user of the newly available media. With the notification, there can also be an audio, visual, and/or tactile notification made through the user's smartphone/tablet app notifying the user of the newly available media.

Thereafter, at the user's leisure, the user can view and/or listen to the streaming version of the media on their streaming service account (block 314). This can be done in a variety of different manners. In some embodiments, a user logs into a streaming account, then selects the media file he/she wishes to view/watch. The list of available media files will include the media file the user just purchased in a physical format. After the user selects the media file, the streaming service can facilitate the playback of the media file. For example, the streaming service can send the media file to the user for playback. In some embodiments, the media file can be streamed to the user. In some embodiments, the media file can become available for download by the user.

The blocks referenced in FIG. 3 need not occur in the order given above. For example, a user can buy physical media (block 306) before creating an account with a streaming service (block 302). In such a situation, a user can be informed of the ability to stream the purchased physical media if the user were to create an account at the streaming service. Such a task can be accomplished in a variety of different manners.

In some embodiments, a user provides a cellular phone number when he purchases items at a physical brick and mortar store or at an Internet storefront. As described above, the cellular phone number can be entered into a POS terminal at a checkout counter. Thereafter, the user's cellular phone number is associated with physical goods he purchased at the physical brick and mortar store or the Internet storefront. When the user later creates an account with the streaming service, the user provides a cellular phone number as a unique identifier. The cellular phone number is already associated with the previously purchased physical media. Blocks 310, 312, and 314 can then be accomplished. The user's account is modified to note the availability of the previously purchased physical media. Thereafter, the user can access streaming versions of the goods he purchased.

In some embodiments, a user can provide a cellular phone number at checkout. This can occur either at a brick-and-mortar store or at an eCommerce provider. Thereafter, the user is sent an SMS informing the user of the ability to view the media he/she just purchased by using a streaming service. The SMS can also contain a specific URL. The URL can lead the user to a sign-up page for the streaming service. When the user accesses the URL, the data regarding the media the user purchased at physical brick and mortar store or at an Internet storefront is already stored. The user completes a sign-up procedure with the streaming service and the movies and/or other media he purchased is already associated with his streaming account.

Figure 4:
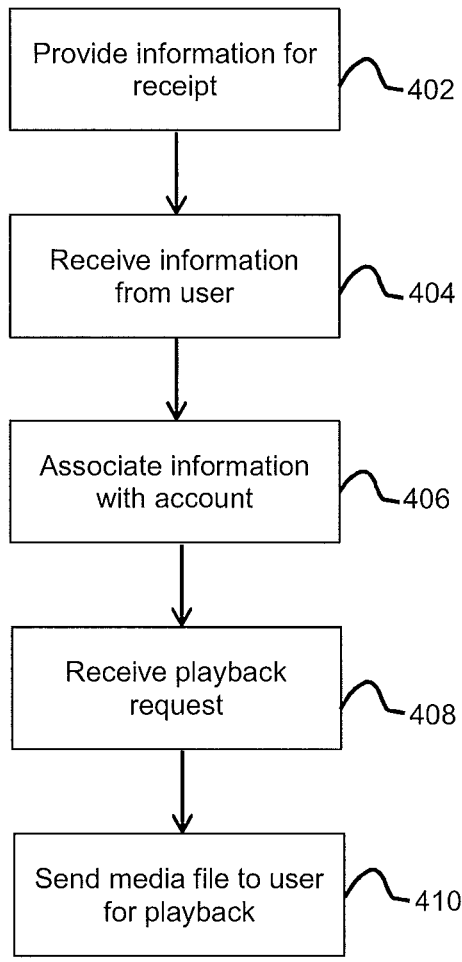
FIG. 4 is a flowchart illustrating the operation of an embodiment.

There can also be a mechanism built into the receipt to enable a user to associate physical media with a user's streaming account. With reference to FIG. 4, a flowchart illustrating method 400 for associating a receipt to a streaming service is provided. Various aspects of method 400 can be performed on a computer system 100 (FIG. 1). Method 400 is merely exemplary and is not limited to the embodiments presented herein. Method 400 can be employed in many different embodiments or examples not specifically depicted or described herein. In some embodiments, the procedures, the processes and/or the activities of method 400 can be performed in the order presented. In other embodiments, the procedures, the processes, and/or the activities of method 400 can be performed in any other suitable order. In still other embodiments, one or more of the procedures, the processes, and/or the activities of method 400 can be combined or skipped.

In some instances, a user might not have an account with the streaming service at the time of purchase. Or the user might not enter his/her unique identifier at a POS terminal at the time of purchase. Method 400 can be used for such a situation.

After a user purchases a physical media item at a physical brick and mortar store or online at an eCommerce provider, the user is typically provided with a receipt. An embodiment can provide purchase information to the brick and mortar store that is to be printed on the receipt (block 402). Information on how to sign up for a service can be located on the receipt. For example, the user can be informed of the existence of the streaming service provider. The user can also be informed that the physical media that he/she just purchased could be made available to the user as part of a streaming service. The user can also be provided with a URL to access sign up for the streaming service. The user can also be provided with a special code that will allow the user to associate the user with the purchase of physical he just made. The code can be alphanumeric, so that the user can just enter the code in an appropriate place on a website or app (block 404).

In some embodiments, the purchase information can be in a scannable form, such as a bar code or a QR code. The user can then use an app on his smartphone/tablet to photograph the bar code or QR code. The app will process the bar code or QR code. The bar code or QR code can contain purchase information about the recently purchased physical media. Therefore, when the user establishes a streaming service account, the recently purchased physical media can be made available in streaming form to the user. In addition, if the user already has a streaming service account, scanning the bar code or QR code can enable the recently purchased physical media to be associated with the user's streaming service account (block 406).

In some embodiments, the information from the receipt can be sent to the user via an SMS message. For example, a user can enter his mobile telephone number into a POS terminal at a brick and mortar store. Thereafter, the user is sent an SMS that contains information, such as in a coded URL, that can allow the user to establish or log in to a streaming service account have the physical media associated with that streaming service account.

After the physical media is associated with the user's streaming service account, the user can select the media file to be played (block 408). Thereafter, the user can view/listen to the streaming version of the media on their streaming service account (block 410).

In some embodiments, a user can purchase a physical media item on-line, such as via an eCommerce provider. When the user purchases the item, the user enters various information about himself, such as his email address. The user can be sent an email that contains a hyperlink that allows the user to have access to an on-line streaming service through which he can view the media he just purchased. The hyperlink can be encoded such that it contains information about the physical media that the user just purchased. In such a manner, when the user clicks on the hyperlink, the data about which physical media the user just purchased can be linked to the user's account. In some embodiments, if the user already has a streaming service account associated with the email address, the user's streaming service account can be updated with the information about the newly purchased physical media. In the event the user does not have an account with the streaming service, the data can be stored, such as in a cookie. When the user establishes an account with the streaming service, the stored data can be accessed and the user can be granted access to the media.

In one or more of the above described embodiments, a user can be asked to provide credentials from a digital-rights management system. Exemplary digital rights management systems include such as UltraViolet or Disney Movies Anywhere. A digital rights management system can allow a user who purchased physical digital media to provide an activation code to a digital rights locker, confirming that the user owns a particular physical digital media item. The activation code can be a code located within the paper materials of the packaging. In another embodiment, the activation code could be located on physical media. In such a case, the user would insert the physical media into his computer to confirm ownership of the digital media item. In another embodiment, a user with an account with a digital rights management system can have that account linked with the user's streaming service account. In such a manner, even movies purchased before the user had a streaming service account can be made accessible to the user.

Figure 5:
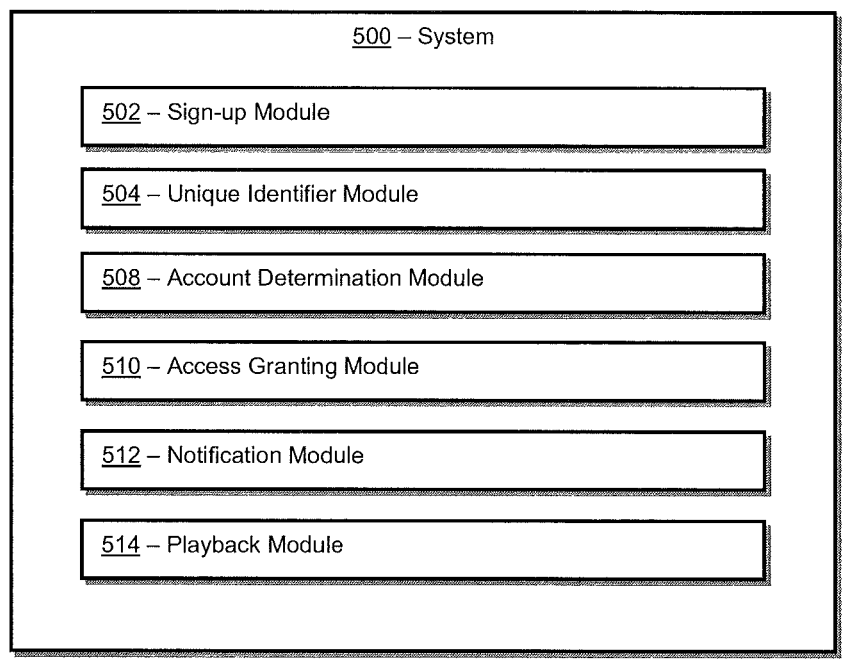
FIG. 5 is a block diagram illustrating a system arranged to perform tasks according to an embodiment.

Turning ahead in the figures, FIG. 5 illustrates a block diagram of a system 500 arranged to perform various tasks. System 500 is merely exemplary and is not limited to the embodiments presented herein. System 500 can be employed in many different embodiments or examples not specifically depicted or described herein. In some embodiments, certain elements or modules of system 500 can perform various procedures, processes, and/or acts. In other embodiments, the procedures, processes, and/or acts can be performed by other suitable elements or modules. As an example, system 500 can be implemented using computer system 100 (FIG. 1).

Returning to FIG. 5, in a number of embodiments, system 500 can include sign-up module 502. In certain embodiments, sign-up module 502 can perform block 302 (FIG. 3) of allowing a user to sign-up for a streaming service account.

Returning to FIG. 5, in a number of embodiments, system 500 can include unique identifier module 504. In certain embodiments, unique identifier module 504 can perform block 304 (FIG. 3) of associating a unique identifier with a streaming service account.

Returning to FIG. 5, in a number of embodiments, system 500 can include account determination module 508. In certain embodiments, account determination module 508 can perform block 308 (FIG. 3) of determining if a user who purchased physical media has a streaming service account.

Returning to FIG. 5, in a number of embodiments, system 500 can include access granting module 510. In certain embodiments, access granting module 510 can perform block 310 (FIG. 3) of granting access to a media file in a streaming service account.

Returning to FIG. 5, in a number of embodiments, system 500 can include notification module 512. In certain embodiments, notification module 512 can perform block 312 (FIG. 3) of notifying a user of the availability of a media file within a streaming service account.

Returning to FIG. 5, in a number of embodiments, system 500 can include playback module 514. In certain embodiments, playback module 514 can perform block 314 (FIG. 3) of sending a media file to a user for playback, using the user's streaming service account.

Figure 6:
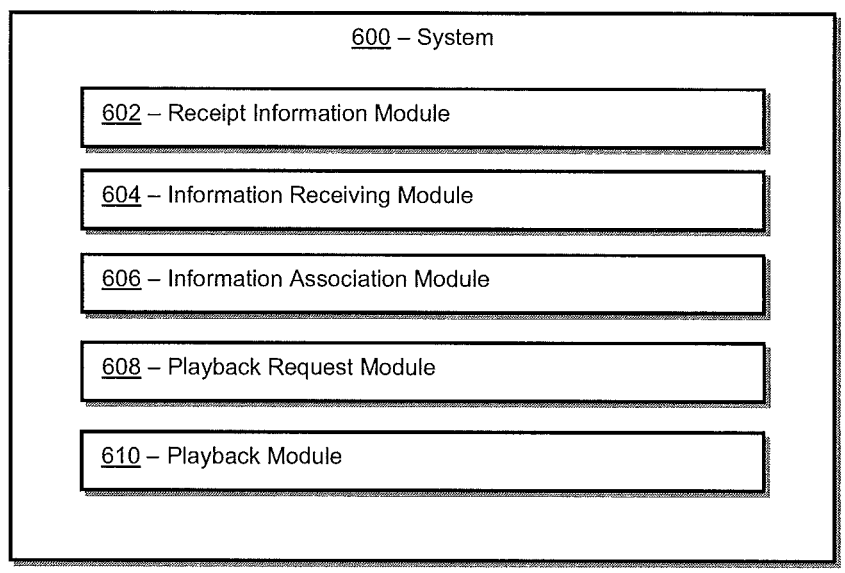
FIG. 6 is a block diagram illustrating a system arranged to perform tasks according to an embodiment.

Turning ahead in the figures, FIG. 6 illustrates a block diagram of a system 600 arranged to perform various tasks. System 600 is merely exemplary and is not limited to the embodiments presented herein. System 600 can be employed in many different embodiments or examples not specifically depicted or described herein. In some embodiments, certain elements or modules of system 600 can perform various procedures, processes, and/or acts. In other embodiments, the procedures, processes, and/or acts can be performed by other suitable elements or modules. As an example, system 600 can be implemented using computer system 100 (FIG. 1).

Returning to FIG. 6, in a number of embodiments, system 600 can include receipt information module 602. In certain embodiments, receipt information module 602 can perform block 402 (FIG. 4) of providing information for printing on a receipt indicating the purchase of physical media.

Returning to FIG. 6, in a number of embodiments, system 600 can include information receiving module 604. In certain embodiments, information receiving module 604 can perform block 404 (FIG. 4) of receiving information associating a user with physical media.

Returning to FIG. 6, in a number of embodiments, system 600 can include information association module 606. In certain embodiments, information association module 606 can perform block 406 (FIG. 4) of associating information with a user's streaming service account.

Returning to FIG. 6, in a number of embodiments, system 600 can include playback request module 608. In certain embodiments, playback request module 608 can perform block 408 (FIG. 4) of receiving a request to playback media using a streaming service account.

Returning to FIG. 6, in a number of embodiments, system 600 can include playback module 610. In certain embodiments, playback module 610 can perform block 410 (FIG. 4) of sending a media file to a user for playback, using the user's streaming service account.

Although the above embodiments have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-6 can be modified, and that the foregoing discussion of certain of these embodiments does not necessarily represent a complete description of all possible embodiments. For example, one or more of the procedures, processes, or activities of FIGS. 1-6 can include different procedures, processes, and/or activities and be performed by many different modules, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:

one or more processors; and one or more non-transitory storage devices storing computing instructions configured to run on the one or more processors and perform acts of:
    receiving a unique identifier used to identify an electronic media account of a user, wherein the unique identifier is supplied by the user at a time of purchase of a physical media item;
    determining that the unique identifier used to identify the electronic media account is not associated with the electronic media account;
    in response to determining that the unique identifier is not associated with the electronic media account:
        transmitting a cookie for storage on an electronic device of the user, the cookie comprising data verifying the purchase of the physical media item;
        subsequent to transmitting the cookie, detecting a subsequent association of the unique identifier with the electronic media account, by receiving a signal indicating that the unique identifier has been associated with the electronic media account; and
    in response to detecting the subsequent association of the unique identifier with the electronic media account:
        accessing the cookie to verify the purchase of the physical media item;
        in response to verifying the purchase of the physical media item, providing, to an electronic media service, an indication that the electronic media account is eligible for access to electronic media associated with the physical media item; and
        sending a notification comprising an indication that the electronic media account has access to the electronic media associated with the physical media.

2. The system of claim 1, wherein:

the unique identifier comprises a telephone number or an email address.

3. The system of claim 2, wherein:

the unique identifier:
    is associated with the electronic media account, the electronic media account comprising a streaming service account; and
    comprises the telephone number; and the notification comprises a short message system (SMS) message that provides a verification token that comprises an alphanumeric code or a numeric code.

4. The system of claim 2, wherein:

the unique identifier:
    is associated with the electronic media account, the electronic media account comprising a streaming service account; and
    comprises the telephone number;

the notification comprises a mobile device operating system notification that provides a verification token that comprises at least one of:
    an alphanumeric code;
    a numeric code;
    an audio code;
    a visual code; or
    a tactile code.

5. The system of claim 2, wherein:
the unique identifier:
is associated with the electronic media account, the electronic media account comprising a streaming service account; and
comprises the email address;
the notification comprises an email
that provides a verification token that comprises at least one of:
an alphanumeric code;
a numeric code;
an audio code;
a visual code; or
a tactile code.

6. The system of claim 1, wherein the computing instructions are further configured to run on the one or more processors and perform acts of:
receiving a request to initiate playback of the electronic media associated with the physical media item; and
transmitting the electronic media associated with the physical media item to the user for playback.

7. The system of claim 1, wherein:
the purchase of the physical media item occurs at a brick and mortar retail store; and
receiving the unique identifier from the user comprises:
receiving the unique identifier from the user via a computer system associated with the brick and mortar retail store.

8. The system of claim 1, wherein:
the purchase of the physical media item occurs via a website of an eCommerce retailer; and
receiving the unique identifier from the user comprises:
receiving the unique identifier from the user via the website of the eCommerce retailer.

9. The system of claim 1, wherein the computing instructions are configured to perform an act of: providing association information printed on a receipt associated with the purchase of the physical media item, wherein the association information, upon submission to the electronic media service, is configured to facilitate eligibility for the electronic media account to access the electronic media associated with the physical media item.

10. The system of claim 1, comprising an activation code inside a packaging of the physical media item, wherein the activation code, upon submission to the electronic media service, is configured to facilitate eligibility for the electronic media account to access the electronic media associated with the physical media item.

11. A method implemented via execution of computing instructions configured to run at one or more processors and configured to be stored at non-transitory computer-readable media, the method comprising:
receiving a unique identifier used to identify an electronic media account of a user, wherein the unique identifier is supplied by the user at a time of purchase of a physical media item;
determining that the unique identifier used to identify the electronic media account is not associated with the electronic media account;
in response to determining that the unique identifier is not associated with the electronic media account:
transmitting a cookie for storage on an electronic device of the user, the cookie comprising data verifying the purchase of the physical media item;
subsequent to transmitting the cookie, detecting a subsequent association of the unique identifier with the electronic media account, by receiving a signal indicating that the unique identifier has been associated with the electronic media account; and
in response to detecting the subsequent association of the unique identifier with the electronic media account:
accessing the cookie to verify the purchase of the physical media item;
in response to verifying the purchase of the physical media item, providing, to an electronic media service an indication that the electronic media account is eligible for access to electronic media associated with the physical media item; and
sending a notification comprising an indication that the electronic media account has access to the electronic media associated with the physical media.

12. The method of claim 11, wherein:
the unique identifier comprises a telephone number or an email address.

13. The method of claim 12, wherein:
the unique identifier:
is associated with a streaming service account; and
comprises the telephone number;
the notification comprises:
a short message system (SMS) message
that provides a verification token that comprises an alphanumeric code or a numeric code.

14. The method of claim 12, wherein:
the unique identifier:
is associated with a streaming service account; and
comprises the telephone number;
the notification comprises a mobile device operating system notification
that provides a verification token that comprises at least one of:
an alphanumeric code;
a numeric code;
an audio code;
a visual code; or
a tactile code.

15. The method of claim 12, wherein:
the unique identifier:
is associated with a streaming service account; and
comprises the email address; and
the notification comprises an email that provides a verification token that comprises at least one of:
an alphanumeric code;
a numeric code;
an audio code;
a visual code; or
a tactile code.

16. The method of claim 11 further comprising:
receiving a request to initiate playback of the electronic media associated with the physical media item; and
transmitting the electronic media associated with the physical media item to the user for playback.

17. The method of claim 11, wherein:
the purchase of the physical media item occurs at a brick and mortar retail store; and
receiving the unique identifier from the user comprises:
receiving the unique identifier from the user via a computer system associated with the brick and mortar retail store.

18. The method of claim 11, wherein:
the purchase of the physical media item occurs via a website of an eCommerce retailer; and
receiving the unique identifier from the user comprises:
receiving the unique identifier from the user via the website of the eCommerce retailer.

19. The method of claim 11, wherein a verification token is printed on a receipt associated with the purchase of the physical media item.

20. The method of claim 11, wherein a verification token is inside a packaging of the physical media item.

* * * * *